(12) United States Patent
Zhuo et al.

(10) Patent No.: US 11,429,347 B2
(45) Date of Patent: Aug. 30, 2022

(54) ERROR UNBIASED APPROXIMATE MULTIPLIER FOR NORMALIZED FLOATING-POINT NUMBERS AND IMPLEMENTATION METHOD OF ERROR UNBIASED APPROXIMATE MULTIPLIER

(71) Applicant: ZHEJIANG UNIVERSITY, Zhejiang (CN)

(72) Inventors: Cheng Zhuo, Zhejiang (CN); Chuangtao Chen, Zhejiang (CN); Sen Yang, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 17/190,417

(22) Filed: Mar. 3, 2021

(65) Prior Publication Data
US 2022/0083313 A1 Mar. 17, 2022

(30) Foreign Application Priority Data

Sep. 15, 2020 (CN) .......................... 202010969041.7

(51) Int. Cl.
*G06F 7/487* (2006.01)
(52) U.S. Cl.
CPC ................................. *G06F 7/4876* (2013.01)
(58) Field of Classification Search
CPC ................................ G06F 7/4876; G06F 7/523
See application file for complete search history.

(56) References Cited

FOREIGN PATENT DOCUMENTS

CN 107153522 A * 9/2017

OTHER PUBLICATIONS

Hashemi, Soheil, R. Iris Bahar, and Sherief Reda, "DRUM: Adynamic range unbiased multiplier for approximate applications", 2015 IEEE/ACM International Conference on Computer-Aided Design (ICCAD), 2015 (Year: 2015).*

(Continued)

*Primary Examiner* — Matthew D Sandifer
(74) *Attorney, Agent, or Firm* — JCIP Global Inc.

(57) ABSTRACT

The present invention discloses an error unbiased approximate multiplier for normalized floating-point numbers and an implementation method of the error unbiased approximate multiplier. The error unbiased approximate multiplier includes a symbol and exponent bit module, a mantissa approximation module and a normalization module, wherein the symbol and exponent bit module processes symbolic operation and exponent bit operation of the floating-point numbers; the mantissa approximation module obtains a mantissa approximation result under different accuracy requirements by summing a result of multilevel error correction modules; and the normalization module adjusts an exponent bit according to the operation result of the mantissa and processes the overflow of the exponent bit to obtain the final product result. According to the present invention, for the multiply operation of the normalized floating-point numbers under the IEEE 754 standard, under the controllable accuracy levels, error distribution is unbiased, and area, speed and energy efficiency are obviously improved.

10 Claims, 2 Drawing Sheets

(56) References Cited

OTHER PUBLICATIONS

Imani, Mohsen, et al., "ApproxLP: Approximate multiplication with linearization and iterative error control", Proceedings of the 56th Annual Design Automation Conference, 2019 (Year: 2019).*

Chen, Chuangtao, and Cheng Zhuo, "ICCAD: U: Optimally Approximated Floating-Point Multiplier", 2021 (Year: 2021).*

Chen, Chuangtao, et al., "Optimally approximated and unbiased floating-point multiplier with runtime configurability", Proceedings of the 39th International Conference on Computer-Aided Design, Nov. 2020 (Year: 2020).*

* cited by examiner a)(PRIOR ART)　　　　　　　　b)

ERROR UNBIASED APPROXIMATE MULTIPLIER FOR NORMALIZED FLOATING-POINT NUMBERS AND IMPLEMENTATION METHOD OF ERROR UNBIASED APPROXIMATE MULTIPLIER

CROSS-REFERENCE TO RELATED APPLICATION

This application claims the priority benefit of China application serial no. 202010969041.7, filed on Sep. 15, 2020. The entirety of the above-mentioned patent application is hereby incorporated by reference herein and made a part of this specification.

BACKGROUND

Technical Field

The present invention relates to the technical fields of low power consumption design, approximate calculation, image processing, machine learning and the like, and in particular, to an error unbiased approximate multiplier for normalized floating-point numbers and an implementation method of the error unbiased approximate multiplier.

Description of Related Art

With the rapid development of devices in the Internet of Things, the power consumption of intelligent mobile and wearable devices has become one of the factors that limit the effect of computation-intensive application such as video image processing and the like. Multiplication is the key operation of applications such as image processing, convolutional neural network and the like and is also the key to reduce the power consumption. Specific applications such as multimedia processing and neural network have the tolerance characteristics for errors, which means that approximation in the calculation process has little influence on the result. According to the characteristics, power consumption and area may be greatly reduced while the accuracy of the multiplier is reduced, and speed may be increased.

In recent years, the research of the approximate multiplier mostly focuses on the design of approximate circuit modules such as approximate multiplication or addition modules. The complexity of the circuit is simplified by redesigning the logic circuit of the addition module, for example, the original addition circuit is replaced by the approximate 4-2 and 15-4 Compressors modules. In addition, Parag Kulkarni and the like proposed a 2×2 approximate multiplier, the multiplication result (the error probability is $1/16$) is expressed by 3 bit, the correction error is generated by the approximate multiplier, and a multiplier with a larger bit width is established by adding shift. These approximate multipliers cannot adjust the accuracy due to the fixed logic design, and the general average error is large.

According to other approximate methods, such as the DRUM multiplier, the mantissa with a length k is intercepted and the multiplication result of the partial mantissa is approximate to the product of the mantissas, the accuracy of the result may be adjusted by adjusting the k value, and 1 is supplemented after the intercepted mantissa, such that the result error is unbiased. CFPU and RMAC are approximate multipliers for the floating-point numbers and adopt a hybrid method of approximate and accurate multipliers. When the approximate calculation cannot meet the error requirement, accurate multiplication calculation is adopted, and a threshold required by the error of the CFPU and RMAC may be adjusted, but the accuracy of the approximate part cannot be adjusted. The above three approximate multipliers still need the participation of the accurate multipliers. ApproxLP replaces the nonlinear multiplication operation by the input linear iteration operation and achieves the ability of adjusting the precision in real time without relying on the accurate multipliers. Compared with the previous multipliers, the accuracy and area are improved, but the ApproxLP lacks strict theoretical support and general design methods, such that the accuracy of the linear iteration method cannot be optimized.

In conclusion, providing a general design method for an approximate multiplier with low error, low area and low power consumption is crucial for the development of the intelligent mobile and wearable device.

SUMMARY

An objective of the present invention is to provide an error unbiased approximate multiplier for normalized floating-point numbers and an implementation method of the error unbiased approximate multiplier for the defect of the energy efficiency of the existing approximate multiplier in the prior art. The theoretical analysis shows that by taking the mean square absolute error as a standard, the linear error iteration method of the approximate multiplier has theoretical optimality and has the advantages of small relative error, unbiased error distribution, small area expense, high calculation speed and low power consumption.

The objective of the present invention is achieved by the following technical solutions:

An error unbiased approximate multiplier for normalized floating-point numbers includes a symbol and exponent bit module, a mantissa approximation module and a normalization module, wherein The symbol and exponent bit module performs Exclusive OR processing on symbol bits of the input normalized floating-point numbers, performs add operation on the exponent bit and subtracts an offset $2^n-1$, n being the bit number of the exponent bit;

The mantissa approximation module comprises a 0-level approximation module and multilevel error correction modules, both the 0-level approximation module and the multilevel error correction modules take the mantissas of the floating-point numbers as input, each error correction module needing an enable signal; the 0-level approximation module generates a basic approximate mantissa multiplication result, i.e. $a_0 = 15 \times (X+Y) - 2.25$, the error correction module outputs progressive error correction when enabled, the error correction is summation of the shift of the input mantissa and a constant, i.e. $a_i \pm (X \gg A) \pm (Y \gg B) + C$, $a_i$ is the output result of the i-level error correction module, X, Y represent the actual values represented by the mantissas of the input floating-point numbers and are in a range of [1,2) for the normalized floating-point numbers, A and B are right shift numbers, and C is an offset value of the floating-point numbers; the mantissa approximation module outputs the results of the 0-level approximation module and the enabled error correction module to perform summation to obtain an approximate mantissa product result;

The normalization module adjusts the approximate mantissa product result for normalization, that is, to make the approximate mantissa product result in a range of [1,2), and the output of the symbol and exponent bit module is adjusted correspondingly at the same time to obtain a to-be-output exponent result; finally, the to-be-output exponent result is subjected to overflow judgment; the result is assigned to be infinity under the IEEE 754 standard if the exponent bit overflows upwards, and the result is assigned to be 0 under the IEEE 754 standard if the exponent bit overflows downwards; and if overflow does not occur, the current symbol bit, the to-be-output exponent result and the approximate mantissa product result serve as output to obtain the final result of the approximate multiplication of the two normalized floating-point numbers.

Further, the subtraction of the offset $2^n-1$ from the exponent bit is specifically as follows: for the 32-bit floating-point number under the IEEE 754 standard, n=8; and for the 64-bit floating-point number, n=11.

Further, the error unbiased approximate multiplier adjusts approximate accuracy in the computing process by enabling different number of error correction modules.

Further, the exponent bit output result of the symbol and exponent bit module is to subtract the offset $2^n-1$ from the sum of the exponent bits of the input normalized floating-point numbers, and the exponent bit is subjected to two-bit extension toward a high bit for judging upward and downward overflow; in case of upward overflow, the highest two bits are 01, and at this time, $z_e-(2^n-1)>(2^n-1)$, the result is a number that is too large to express, that is, plus or minus infinity, $z_e$ representing a to-be-output exponent result; in case of downward overflow, the highest two bits are 11, and at this time, $z_e-(2^n-1)<0$ the result is a number that is too small to express, that is, plus or minus 0; and in case of no overflow, the highest two bits are 00.

Further, the mantissa approximation module defaults the input floating-point number to be a normalized floating-point number, complements the mantissa by 1 to obtain an actual value of the mantissa in a range of, and performs bit extension on the highest bit, that is complements by 0, such that the express range of the mantissa is [0,4]; the 0-level approximation module generates a basic approximate mantissa multiplication result; the error correction module adopts a method for performing linear processing on the mantissa; and the shift number and the offset in the error correction module are determined by the range of the module series and the input mantissa.

Further, the error correction module performs square division on the mantissa interval of the two input floating-point numbers: the k-level error correction module divides the range [1,2) of the mantissa into $2^k$ equal intervals, and it is necessary to judge the interval of the mantissa by the previous k bit of the mantissa; the interval division of the two input mantissas are independent of each other, that is, the module divides the input interval of [1,2)×[1,2) into $4^k$ identical squares; meanwhile, different levels of error correction modules are independent of each other, that is, operation of each module does not depend on the results of other modules.

Further, the linearized approximation method of the error correction module is to the lowest mean square error result and unbiased error distribution in the square division mode according to the principle of the minimization problem in linear algebra.

Further, the normalization module processes the output result of the mantissa approximation module and the output result of the symbol and exponent bit module, specifically as follows: the value of the output result of the mantissa approximation module is in a range of [1,2) by multiplying the output result of the mantissa approximation module by 2, dividing by 2 or not processing; when the output result of the mantissa approximation module is greater than or equal to 2, the output result of the mantissa approximation module is shifted to right and 1 is subtracted from the exponent part in the output of the symbol and exponent bit module; when the output result of the mantissa approximation module is less than 1, the output result of the mantissa approximation module is shifted to left and 1 is added to the exponent part in the output of the symbol and exponent bit module; when the output result of the mantissa approximation module is between [1,2), the output result of the mantissa approximation module is maintained unchanged; and after the normalization module processes the output result of the mantissa approximation module and the output result of the symbol and exponent module, the processed output result of the mantissa approximation module serves as a to-be-output mantissa result, and the processed exponent part of the symbol and exponent bit module serves as the to-be-output exponent result.

Further, the normalization module performs overflow judgment on the to-be-output exponent; when the higher two bits of the to-be-output exponent result are 01, it indicates that upward overflow occurs and the result is assigned to be infinity meeting the IEEE 754 standard, that is, the exponent bits are all 1 and the mantissa bits are all 0; when the higher two bits of the to-be-output exponent result are 11, it indicates that downward overflow occurs and the result is assigned to be zero under the IEEE 754 standard, that is, the exponent bits and the mantissa bits are all 0; and when the higher two bits of the to-be-output exponent are 00, overflow does not occur, the symbol bit in the output of the symbol and exponent bit module serves as an output symbol bit, the to-be-output exponent result with the higher two bits removed serves as an output exponent bit, and the to-be-output mantissa result with higher two bits removed serves as an output mantissa bit.

The present invention further provides an implementation method of the error unbiased approximate multiplier for the normalized floating-point numbers, which is specifically implemented by the following steps:

(1) the symbol and exponent bit module performs Exclusive OR processing on symbol bits of a multiplier and a multiplicand in input normalized floating-point numbers, extends the high bit of the exponent bits by 2 bits, sums the exponent bits of the multiplier and the multiplicand and subtracts the offset $2^n-1$ to obtain an exponent bit result of the symbol and exponent bit module;

(2) the 0-level approximation module and the multilevel error correction modules in the mantissa approximation module all take the mantissas of the floating-point numbers as input, each error correction module needing an enabling signal; the output of the 0-level approximation module is: $a_0=1.5\times(X+Y)-2.25$; the output of the i-level error correction module is $a_i=\pm(X>>A)\pm(Y>>B)+C$; the mantissa approximation module sums the result output of the 0-level approximation module and the enabled error correction module to obtain an approximate mantissa product result;

(3) the normalization module takes the outputs of the symbol and exponent bit module and the mantissa approximation module as input, and the value of the output result of the mantissa approximation module is in a range of [1,2) by multiplying the output result of the mantissa approximation module by 2, dividing by 2 or not processing; when the output of the mantissa approximation module is divided by 2, 1 is added to the exponent part in the output of the symbol and exponent bit module; when the output of the mantissa approximation module is multiplied by 2, 1 is subtracted from the exponent part in the output of the symbol and exponent bit module; when the output of the mantissa approximation module is not processed, the exponent part in the output of the symbol and exponent bit module is not processed, the normalization module obtains a to-be-output mantissa result and the to-be-output exponent result; and (4) the higher two bits of the to-be-output exponent result is subjected to overflow judgment: when the higher two bits are 01, upward overflow occurs and the result is assigned to be infinity under the IEEE 754 standard; when the higher two bits are 11, downward overflow occurs and the result is assigned to be 0 under the IEEE 754 standard; when the higher two bits are 00, overflow does not occur and the symbol bit in the output of the symbol and exponent bit module is an output symbol bit, the to-be-output exponent result with higher two bits removed serves as an output exponent bit, and the to-be-output mantissa result with higher two bits removed serve as an output mantissa bit.

Beneficial effects of the present invention are as follows:

1) According to the present invention, the approximate multiplier for the floating-point numbers in the form of specification is realized, and area, speed and energy efficiency are obviously improved under the condition of controllable accuracy levels; and the present invention is suitable for image processing, machine learning and other applications.

2) The error is subjected to iterative correction in a shift and addition manner, and approximate error can be adjusted in real time in the calculation process.

3) Coefficient in the iteration process is acquired by the minimization problem in linear algebra, such that optimal approximation is realized under the condition of inputting independent judgment and the unbiased distribution of the error is ensured.

DETAILED DESCRIPTION OF EMBODIMENTS

The present invention will be further described in detail with reference to the accompanying drawings and the specific embodiments.

Figure 1:
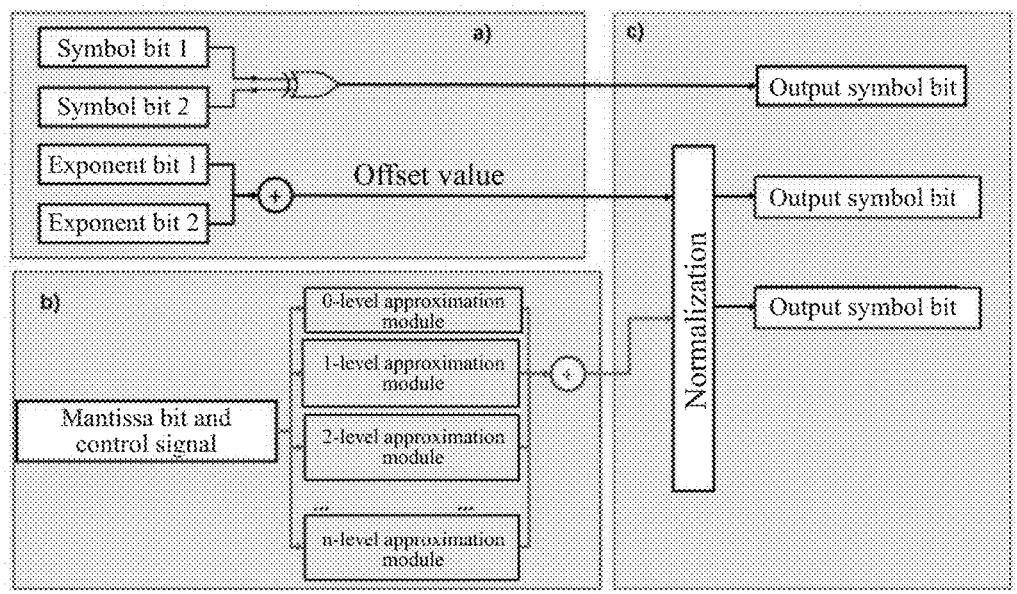
FIG. 1 shows a schematic diagram of an overall architecture of an error unbiased approximate multiplier for normalized floating-point numbers according to the present invention, including three modules: a) a symbol and exponent bit module; b) a mantissa approximation module; and c) a normalization module.

As shown in FIG. 1, the present invention provides an error unbiased approximate multiplier for normalized floating-point numbers, including the following modules:

(1) A symbol and exponent bit module, configured to: perform Exclusive OR processing on symbol bits of the input normalized floating-point numbers:

$$z_s = x_s \oplus y_s$$

$x_s$ and $y_s$ respectively represent symbol bits of the input two multipliers, and $z_s$ is the result of Exclusive OR operation on the symbol bits.

The input exponent bits are subjected to sum operation and an offset is subtracted to acquire the exponent result $t_e$ of the symbol bits and the exponent bits:

$$t_e = x_e + y_e - (2^n - 1)$$

$x_e$ and $y_e$ respective represent the input exponent bits of the two multipliers and the result is extended to n+2 bits for overflow judgment: when upward overflow occurs, that is, $x_e + y_e - (2^n - 1) > (2^n - 1)$, the highest two bits are 01; and if downward overflow occurs, that is, $x_e + y_e - (2^n - 1) < 0$, the highest two bits are 11, wherein n is the bit number of the exponent bit; for the 32-bit floating-point number under the IEEE 754 standard, n=8; and for the 64-bit floating-point number under the IEEE 754 standard, n=11.

(2) The mantissa approximation module includes a 0-level approximation module and multilevel error correction modules which all take the mantissas of the floating-point numbers as input, wherein each error correction module needs an enable signal; the error unbiased approximate multiplier adjusts approximate accuracy in real time in the calculation process by enabling different numbers of error correction modules; and the mantissa approximation module approximates non-linear multiplication operation through linear operation on the input mantissa. The linear operation refers to $Z = XY \approx A'X + B'Y + C'$, wherein $A'$, $B'$, $C'$ are constants, Z is an approximation result, X and Y represent actual values represented by mantissas of the input floating-point numbers, and for the normalized floating-point numbers, the range is [1,2). To avoid reintroduction of the multiplication operation of the constants and the input, the first two coefficients must be restricted to be power of 2 or combination of a small number of powers of 2, and the multiplication operation is converted into shift and addition operation for input. The mantissa approximation module sums the result outputs of the 0-level approximation module and the enabled error correction module to obtain an approximate mantissa product result.

According to the approximate multiplier provided by the present invention, the k-level approximation divides the range [1,2) of the input mantissa into $2^k$ equal intervals and judges that the intervals of the mantissa needs the first k bits; the interval division of the two input mantissas is independent of each other, that is the module divides the input interval of $[1,2) \times [1,2)$ into $4^k$ identical squares; the actual values represented by the first k bits are expressed as $X_k$ and $Y_k$, and the midpoint values of the intervals of the mantissas are $$X_k + \frac{1}{2^{k+1}} \text{ and } Y_k + \frac{1}{2^{k+1}},$$

that is, complementation is performed in the k+1th decimal place, recorded as $\widehat{X_k}$ and $\widehat{Y_k}$. For example, the input mantissa X=1.101011 . . . (represented by binary decimals), the fourth-level approximation needs the first four decimal places of X, $X_4 = 1.1010$, the interval of X is [1.1010, 1.1011), and the midpoint value of the interval is $$\widehat{X_4} = X_4 + \frac{1}{2^{4+1}} = 1.10101.$$

The approximate multiplication result under the k-level approximation is recorded as $s_k$, and according to the minimization problem, the following may be acquired:

$$s_k = \widehat{Y_k} \times X + \widehat{X_k} \times Y - \widehat{X_k} \times \widehat{Y_k}$$

Specifically, when the 0-level approximation module is k=0, $a_0$=1.5x+1.5y−2.25. When k≠0, $a_k=s_k-s_{k+1}$ May ensure the sum $$\sum_k a_i = s_k$$

of the result of each level of module. Further, an expression for calculating $a_i$ is as follows:

$$a_i = X[i]?(1):(-1) \times (Y >> (i+1)) + Y[i]?(1):(-1) \times (X >> (i+1)) + (\widehat{X_{i-1}} \times \widehat{Y_{i-1}} - \widehat{X_i} \times \widehat{Y_i})$$

Each level of error correction module only involves the shift operation of the input mantissa, the i-level error correction module shifts the input to the right by i+1 bits; the X[i]?(1):(−1) expression represents that when X[i] is 1, the result of the expression is 1, and when X[i] is 0, the result of the expression is −1, that is, the plus or minus is determined by the value of the i bit of another input. The offset item $\widehat{X_{i-1}} \times \widehat{Y_{i-1}} - \widehat{X_i} \times \widehat{Y_i}$ is relevant to the interval of the input. If i is not large, it is calculated as a constant in advance, such that a logic unit can be saved.

For example, for the 1-level error correction module, the input interval is divided into four intervals $\{[1, 1.5], [1.5, 2)\} \times \{[1, 1.5], [1.5, 2)\}$. The values of the offset items under different intervals are as follows:

TABLE 1

The values of the offset items under different intervals

| Input the interval of x | Input the interval of y | Offset |
|---|---|---|
| [1, 1.5] | [1, 1.5] | −0.6875 |
| [1, 1.5] | [1.5, 2) | −0.0625 |
| [1.5, 2) | [1, 1.5] | −0.0625 |
| [1.5, 2) | [1.5, 2) | 0.8125 |

Figure 2:
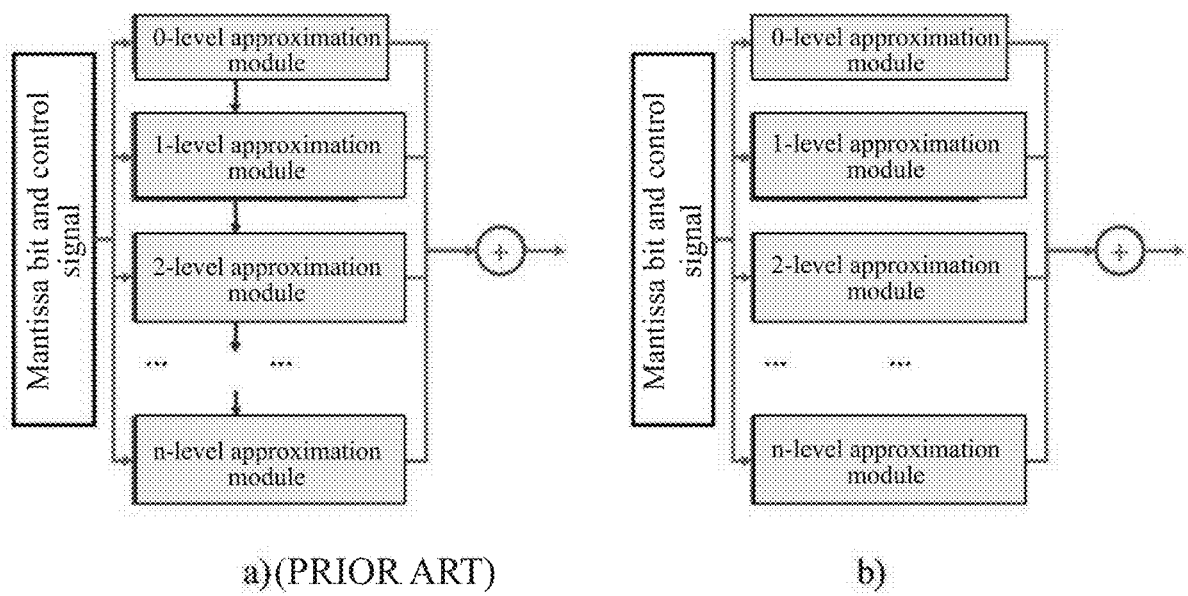
FIG. 2 shows structural difference of an approximate multiplier according to the present invention and ApproxLP at a mantissa approximate part, wherein a) is a structural diagram of a mantissa approximation module of the ApproxLP; and b) is a structural diagram of a mantissa approximation module of the approximate multiplier according to the present invention.
Figure 3:
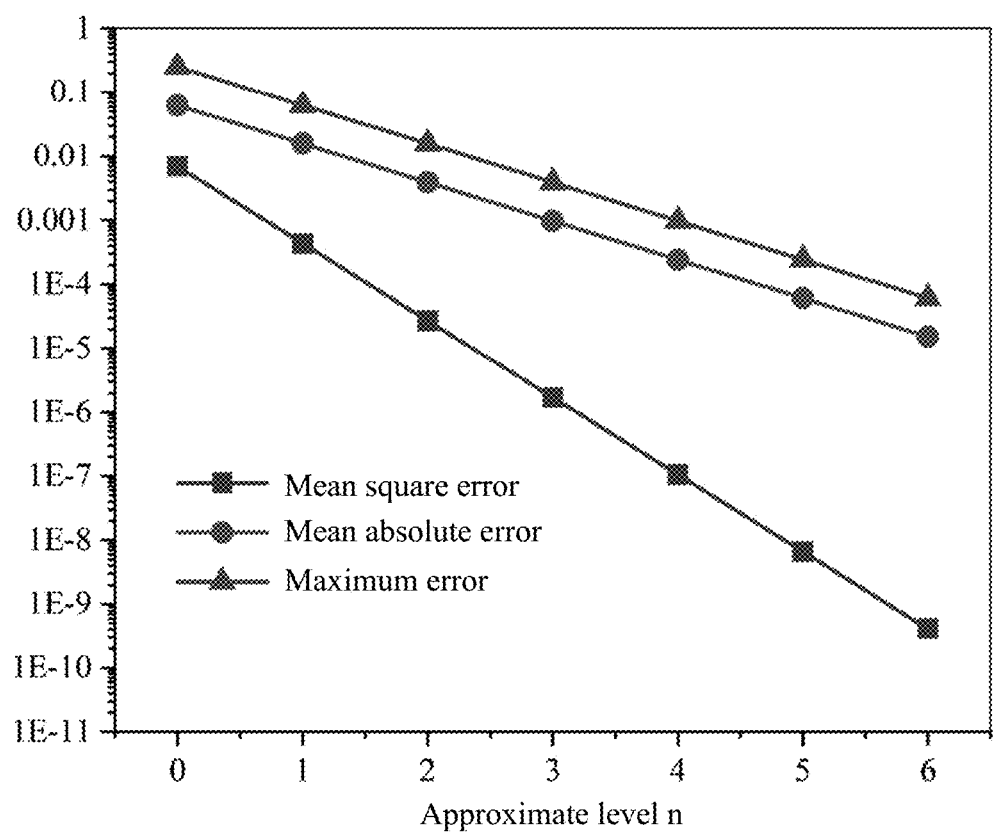
FIG. 3 shows a schematic diagram of mean square error MSE, mean absolute error MAE and maximum error Max Error of an approximate multiplier according to the present invention under different approximate levels for the input of the uniformly distributed random floating-point numbers.

As shown in FIG. 2, it is a schematic diagram of structural difference of an approximate multiplier according to the present invention and ApproxLP at a mantissa approximate part. a) in FIG. 2 is a structural diagram of a mantissa approximation module of the ApproxLP, and the higher level of error correction module depends on the judgment result of the lower level of error correction module. b) in FIG. 2 is a structural diagram of a mantissa approximation module of the approximate multiplier according to the present invention, and there is no dependency relationship among different levels of modules. Compared with the ApproxLP approximate multiplier, the approximate multiplier according to the present invention performs independent judgment on the input of the two floating-point numbers, the judgment on different levels of module is independent, the higher level of error correction module does not depend on the judgment result of the lower level of error correction module, and it is unnecessary for each module to judge the area with all the bits, thereby simplifying judgment logic and circuit delay. Moreover, as shown in FIG. 3, for the input of the uniformly distributed random floating-point numbers, under different approximate levels, the more the approximate levels are, the smaller the mean square error MSE, the mean absolute error MAE and maximum error Max Error of the approximate multiplier according to the present invention are.

For each interval number, a preset offset value is required, which is very convenient and simple for the lower level of modules. However, the number is exponentially related to the complexity of the module level. For the higher level of error correction modules, the following optimization method is proposed:

The i-level error correction result is equivalent to the following form:

$$a_i = Y[i]?(-1):(1) \times ((\widehat{X_{i-1}} - X) >> (i+1)) + X[i]?(-1):(1) \times ((\widehat{Y_{i-1}} - Y) >> (i+1)) + (X[i] \oplus Y[i])?(1):(-1) >> (2i+2)$$

The approximation module adopting the above expression adds two addition operations and one shift and Exclusive OR operation, but it is unnecessary to calculate the offset value in advance, such that the complexity of the circuit can be greatly reduced when the approximation level is higher.

(3) The normalization module adjusts the range of the output result of the mantissa approximation module to meet the normalization requirement. The mantissas of the normalization floating-point numbers are in a range of [1,2). Due to the approximate calculation, the approximate product of the two mantissas is in a range of (0.5, 4). When the product result of the mantissas is in a range of (0.5, 4), the higher two bits are 00, the result is shifted to the left by one bit to serve as a to-be-output mantissa result, and one is subtracted from the exponent result $t_e$ of the symbol bit and the exponent bit to serve as a to-be-output exponent result $z_e$, that is, $z_e$. When the product result of the mantissas is in a range of [2, 4), the highest bit is 1, the result is shifted to the right by one bit to serve as a to-be-output mantissa result, and one is added to the exponent result of the symbol bit and the exponent bit to serve as a to-be-output exponent result, that is, $z_e = t_e + 1$. When the product result of the mantissas is in a range of [1,2), the highest two bits are 01, the result directly serves as a to-be-output mantissa result without shifting, and the exponent result of the exponent bit directly serves as a to-be-output exponent result, that is, $z_e = t_e$.

After the above operation, the to-be-output exponent results are judged as follows: when the higher two bits of the to-be-output exponent result is 01, it indicates that upward overflow occurs, that is, a number which is too large to be express, the result is assigned to be infinity meeting the IEEE 754 standard, that is, the exponent bits are all 1 and the mantissa bits are all 0; and when the higher two bits of the final exponent result are 11, it indicates that downward overflow occurs, that is a number which is too small to express, the result is assigned to be 0 meeting the IEEE 754 standard, that is, the exponent bits and the mantissa bits are all 0. If no overflow occurs, the symbol bit in the output of the symbol and exponent bit module serves as an output symbol bit, the higher two bits are removed from the to-be-output exponent result to serve as an output exponent bit, and a decimal part output by the mantissa approximation module serve as an output mantissa bit.

The present invention further provides an implementation method of the error unbiased approximate multiplier for the normalized floating-point numbers, which is specifically implemented by the following steps:

(1) the symbol and exponent bit module performs Exclusive OR processing on symbol bits of a multiplier and a multiplicand in the input normalized floating-point numbers, extends the high bit of the exponent bits by 2 bits, sums the exponent bits of the multiplier and the multiplicand and subtracts the offset $2^n-1$ to obtain an exponent bit result of the symbol and exponent bit module;

(2) the 0-level approximation module and the multilevel error correction modules in the mantissa approximation module all take the mantissas of the floating-point numbers as input, each error correction module needing an enabling signal; the output of the 0-level approximation module is: $a_0=1.5\times(X+Y)-2.25$; the output of the i-level error correction module is $a_i\pm(X>>A)\pm(Y>>B)+C$; the mantissa approximation module sums the result output of the 0-level approximation module and the enabled error correction module to obtain an approximate mantissa product result;

(3) the normalization module takes the output of the symbol and exponent bit module and the mantissa approximate module as input, and the value of the output result of the mantissa approximate module is in a range of [1,2) by multiplying the output result of the mantissa approximate module by 2, dividing by 2 or not processing; when the output of the mantissa approximate module is divided by 2, 1 is added to the exponent part in the output of the symbol and exponent bit module; when the output of the mantissa approximate module is multiplied by 2, 1 is subtracted from the exponent part in the output of the symbol and exponent bit module; when the output of the mantissa approximate module is not processed, the exponent part in the output of the symbol and exponent bit module is not processed, the normalization module obtains a to-be-output mantissa result and the to-be-output exponent result; and (4) the higher two bits of the to-be-output exponent result is subjected to overflow judgment: when the higher two bits are 01, upward overflow occurs and the result is assigned to be infinity under the IEEE 754 standard; when the higher two bits are 11, downward overflow occurs and the result is assigned to be 0 under the IEEE 754 standard; when the higher two bits are 00, overflow does not occur and the symbol bit in the output of the symbol and exponent bit module is an output symbol bit, the to-be-output exponent result with higher two bits removed serves as an output exponent bit, and the to-be-output mantissa result with higher two bits removed serve as an output mantissa bit.

This patent is not limited to the preferred embodiments above. Any person may obtain other forms of configurable approximate multipliers and the implementation methods thereof under the enlightenment of this patent. All equivalent changes and modifications made according to the patent scope of the present invention shall be covered within the scope of the patient.

What is claimed is:

1. An error unbiased approximate multiplier for normalized floating-point numbers for image processing or machine learning, the error unbiased approximate multiplier comprising a processor, wherein the processor is configured to:

perform Exclusive OR operation on symbol bits of the normalized floating-point numbers to obtain a current symbol bit;

perform add operation on exponent bits of the normalized floating-point numbers and subtraction of an offset $2^n-1$ to obtain a current exponent bit, where n is a bit number of the exponent bits;

generate an enable signal to enable a 0-level approximation circuit;

generate at least one further enable signal to enable at least one error correction circuit of a plurality of multilevel error correction circuits;

wherein the 0-level approximation circuit and the plurality of multilevel error correction circuits take the mantissas of the floating-point numbers as input and operate independently from one another in parallel;

wherein the 0-level approximation circuit is configured to generate a basic approximate mantissa multiplication result, i.e. $a_0=1.5\times(X+Y)-2.25$, where X and Y are actual values of mantissa bits of the normalized floating-point numbers and are in a range of [1,2);

wherein the plurality of multilevel error correction circuits are configured to perform at least one error correction in progressive by using the at least one further enable signal to obtain at least one error correction output result, wherein each of the at least one error correction is summation of the mantissa bits shifted and a constant, i.e. $a_i=\pm(X>>A)\pm(Y>>B)+C$, where $a_i$ is a i-th error correction output result of the at least one error correction output result, A and B are right shift numbers, and C is an offset value of the normalized floating-point numbers;

perform summation of the basic approximate mantissa multiplication result and the at least one error correction output result to obtain an approximate mantissa product result;

adjust the approximate mantissa product result for normalization to obtain a to-be-output mantissa result in the range of [1,2) and adjust the current exponent bit correspondingly at the same time to obtain a to-be-output exponent result;

perform overflow judgment on the to-be-output exponent result to obtain a final result; wherein the final result is assigned to be infinity under the IEEE 754 standard if the to-be-output exponent result overflows upwards, and the final result is assigned to be 0 under the IEEE 754 standard if the to-be-output exponent result overflows downwards; and output the final result if overflow does not occur on the to-be-output exponent result, wherein the current symbol bit, the to-be-output exponent result and the to-be-output mantissa result serve as the final result.

2. The error unbiased approximate multiplier for the normalized floating-point numbers according to claim 1, wherein the subtraction of the offset $2^n-1$ from the exponent bits is specifically as follows: n=8 for the normalized floating-point numbers are 32-bit under the IEEE 754 standard; and n=11 for the normalized floating-point numbers are 64-bit.

3. The error unbiased approximate multiplier for the normalized floating-point numbers according to claim 1, wherein the processor is further configured to adjust an approximate accuracy in the computing process by using different numbers of the at least one enable signal.

4. The error unbiased approximate multiplier for the normalized floating-point numbers according to claim 1, wherein the processor is further configured to perform bit extension toward on the highest two bits of the current exponent bit to obtain the to-be-output exponent result for the overflow judgment;

wherein in case of upward overflow, the highest two bits of the to-be-output exponent result are 01, and at this time, $z_e-(2^n-1)>(2^n-1)$, the final result is too large to express, such that plus or minus infinity, where $z_e$ representing the to-be-output exponent result; in case of downward overflow, the highest two bits of the to-be-output exponent result are 11, and at this time, $z_e-(2^n-1)<0$, the final result is too small to express, such that plus or minus 0; and in case of no overflow, the highest two bits of the to-be-output exponent result are 00.

5. The error unbiased approximate multiplier for the normalized floating-point numbers according to claim 1, wherein the processor is further configured to:
  complement the mantissa bits by 1 to obtain the actual values of the mantissa bits in the range of [1,2), and perform bit extension on the highest bit by complementing by 0, such that a express range of the mantissa bits is [0,4);
  perform a linear processing method on the mantissa bits; and
  determine the symbols, the right shift numbers and the offset value in the at least one error correction by a number of the at least one enable signal and a range of the mantissa bits.

6. The error unbiased approximate multiplier for the normalized floating-point numbers according to claim 1, wherein the processor is further configured to:
  perform square division on an interval of the mantissa bits such that divide the range [1,2) of the mantissa bits into $2^k$ equal intervals in a k-th of the at least one error correction; and
  judge the interval of the mantissa bits by the previous k bits of the mantissa bits; wherein the interval division of the mantissas bits are independent of each other, such that an interval [1,2)×[1,2) of two mantissa bits are divided into $4^k$ identical squares; meanwhile, all of the at least one error correction are independent of each other.

7. The error unbiased approximate multiplier for the normalized floating-point numbers according to claim 6, wherein the processor is further configured to perform a linearized approximation method on the mantissa bits to obtain a lowest mean square error result and an error unbiased distribution in the square division according to a minimization problem principle in linear algebra.

8. The error unbiased approximate multiplier for the normalized floating-point numbers according to claim 1, wherein in the normalization, the processor is further configured to:
  adjust the approximate mantissa product result in the range of [1,2) by multiplying by 2, dividing by 2 or not processing;
  shift the approximate mantissa product result to right to obtain the to-be-output mantissa result and subtract the current exponent bit by 1 to obtain the to-be-output exponent result when the approximate mantissa product result is greater than or equal to 2;
  shift the approximate mantissa product result to left to obtain the to-be-output mantissa result and add the current exponent bit by 1 to obtain the to-be-output exponent result when the approximate mantissa product result is less than 1;
  serve the approximate mantissa product result as the to-be-output mantissa result and serve the current exponent bit as the to-be-output exponent result when the approximate mantissa product result is in the range of [1,2).

9. The error unbiased approximate multiplier for the normalized floating-point numbers according to claim 1, wherein when the highest two bits of the to-be-output exponent result are 01, it indicates that upward overflow occurs and the final result is assigned to be infinity under the IEEE 754 standard, such that exponent bits of the final result are all 1 and mantissa bits of the final result are all 0; when the highest two bits of the to-be-output exponent result are 11, it indicates that downward overflow occurs and the final result is assigned to be zero under the IEEE 754 standard, such that the exponent bits of the final result and the mantissa bits of the final result are all 0; and when the highest two bits of the to-be-output exponent are 00, it indicates that overflow does not occur, and the current symbol bi, the to-be-output exponent result with the highest two bits removed, and the to-be-output mantissa result with the highest two bits removed serves as the final result.

10. A method for implementing an error unbiased approximate multiplier for normalized floating-point numbers for image processing or machine learning, the error unbiased approximate multiplier comprising a processor including a 0-level approximation circuit and a plurality of multilevel error correction circuits, the method comprising:
  performing Exclusive OR operation on symbol bits of the normalized floating-point numbers to obtain a current symbol bit, extending the highest two bits of exponent bits of the normalized floating-point numbers, performing add operation on the exponent bit and subtraction of an offset $2^n-1$ to obtain a current exponent bit;
  generating, by the processor, an enable signal to enable a 0-level approximation circuit and at least one further enable signal to enable at least one error correction circuit of a plurality of multilevel error correction circuits;
  generating, by the 0-level approximation circuit, a basic approximate mantissa multiplication result $a_0 = 1.5 \times (X+Y) - 2.25$;
  generating, by the plurality of multilevel error correction circuits, at least one error correction output result $a_i = \pm(X>>A) \pm (Y>>B) + C$ by using the at least one further enable signal, wherein the 0-level approximation circuit and the plurality of multilevel error correction circuits take the mantissas of the floating-point numbers as input and operate independently from one another in parallel; and
  performing, by the processor, summation of the basic approximate mantissa multiplication result and the at least one of error correction output result to obtain an approximate mantissa product result; where X and Y are actual values of mantissa bits of the normalized floating-point numbers, A and B are right shift numbers, and C is an offset value of the normalized floating-point numbers;
  adjusting, by the processor, the current exponent bit and the approximate mantissa product result in a range of [1,2) by multiplying the approximate mantissa product result by 2, dividing by 2 or not processing; when the approximate mantissa product result is divided by 2, adding the current exponent bit by 1; when the approximate mantissa product result is multiplied by 2, subtracting the current exponent bit by 1; when the approximate mantissa product result and the current exponent bit are not processed, serving the approximate mantissa product result as a to-be-output mantissa result and serving the current exponent bit as a to-be-output exponent result; and
  performing, by the processor, overflow judgment on the highest two bits of the to-be-output exponent result; wherein when the highest two bits are 01, it indicates that upward overflow occurs and a final result is assigned to be infinity under the IEEE 754 standard; when the highest two bits are 11, it indicates that downward overflow occurs and the final result is assigned to be 0 under the IEEE 754 standard; and when the highest two bits are 00, it indicates that overflow does not occur and the current symbol bit, the to-be-output exponent result with the highest two bits removed, and the to-be-output mantissa result with the highest two bits removed serve as the final result.

* * * * *